(12) United States Patent
Coppi et al.

(10) Patent No.: US 7,403,156 B2
(45) Date of Patent: Jul. 22, 2008

(54) METHOD AND SYSTEM FOR PERFORMING DIGITAL BEAM FORMING AT INTERMEDIATE FREQUENCY ON THE RADIATION PATTERN OF AN ARRAY ANTENNA

(75) Inventors: Francesco Coppi, Turin (IT); Maurizio Crozzoli, Turin (IT); Daniele Disco, Turin (IT); Renato Scotti, Turin (IT)

(73) Assignees: Telecon Italia S.p.A., Milan (IT); Pirelli & C. S.p.A., Milan (IT)

( * ) Notice: Subject to any disclaimer, the term of this patent is extended or adjusted under 35 U.S.C. 154(b) by 69 days.

(21) Appl. No.: 10/575,855

(22) PCT Filed: Oct. 30, 2003

(86) PCT No.: PCT/EP03/12089

§ 371 (c)(1),
(2), (4) Date: Apr. 14, 2006

(87) PCT Pub. No.: WO2005/050783

PCT Pub. Date: Jun. 2, 2005

(65) Prior Publication Data

US 2007/0126630 A1 Jun. 7, 2007

(51) Int. Cl.
*H01Q 3/00* (2006.01)
(52) U.S. Cl. .................. 342/368; 342/372; 342/377
(58) Field of Classification Search ............. 342/368, 342/372, 377
See application file for complete search history.

(56) References Cited

U.S. PATENT DOCUMENTS 4,779,054 A * 10/1988 Monteleone et al. ........ 329/323

(Continued)

FOREIGN PATENT DOCUMENTS

EP       0 423 552 A2    4/1991

(Continued)

OTHER PUBLICATIONS

Zhao, P. Y. et al., "Considerations for the Hardware Implementation of a Four Element Digital Beamformer," Digest of the Antennas and Propagation Society International Symposium, IEEE, vol. 3, pp. 116-119, (Jun. 20, 1994).

*Primary Examiner*—Gregory C Issing
(74) *Attorney, Agent, or Firm*—Finnegan, Henderson, Farabow, Garrett & Dunner, L.L.P.

(57) ABSTRACT

A method of performing digital beam forming on the radiation pattern of an array antenna using a plurality of antenna elements, each antenna element being coupled to a signal processing chain. A weighting phase is used in which at least a complex weight coefficient is applied to a digital signal in a corresponding signal processing chain. The digital signal is an intermediate frequency digital signal, and the weighting phase has the following steps: a) duplicating the digital signal into a first and a second digital signal; b) processing the first and second digital signals by multiplying the first and second digital signals respectively by a real and an imaginary part of the complex weight coefficient; applying a Hilbert transform to that signal which is multiplied by the imaginary part of the complex weight coefficient; and c) combining the processed first and second digital signals into a weighted digital intermediate frequency signal by subtracting the second signal from the first signal.

18 Claims, 6 Drawing Sheets

U.S. PATENT DOCUMENTS

| | | | |
|---|---|---|---|
| 5,274,386 A * | 12/1993 | Pellon | 342/380 |
| 6,052,085 A | 4/2000 | Hanson et al. | |
| 6,711,214 B1 * | 3/2004 | Hershberger | 375/285 |
| 7,127,008 B2 * | 10/2006 | Kroeger | 375/321 |
| 2002/0154687 A1 | 10/2002 | Bierly et al. | |

FOREIGN PATENT DOCUMENTS

| | | |
|---|---|---|
| EP | 0 917 325 A2 | 5/1999 |
| EP | 0 917 325 A3 | 5/1999 |
| EP | 1 079 461 A2 | 2/2001 |
| EP | 1 079 461 A3 | 2/2001 |
| WO | WO 03/015212 A1 | 2/2003 |

* cited by examiner

METHOD AND SYSTEM FOR PERFORMING DIGITAL BEAM FORMING AT INTERMEDIATE FREQUENCY ON THE RADIATION PATTERN OF AN ARRAY ANTENNA

CROSS REFERENCE TO RELATED APPLICATION

This application is a national phase application based on PCT/EP2003/012089, filed Oct. 30, 2003, the content of which is incorporated herein by reference.

FIELD OF THE INVENTION

The present invention refers to a method and a system for controlling the radiation pattern of an array antenna at intermediate frequency (IF) through digital processing.

Array antennas are very attractive solutions whenever beamshaping capability is needed. The beamshape control in array antennas can be accomplished with by manipulating signals at different stages of the transceiver chain.

Even if array antennas have many fields of application, mobile communications are preferred, but not exclusive, ones. In fact, in a mobile communication system the capability of adjusting cell borders and size is certainly a major key factor, especially if it can be performed remotely from a centralised location. As an example, it allows to efficiently cope with traffic spatial distribution periodicity in time, that is typical in urban areas, as well as with the cell breathing effect of CDMA-based networks).

BACKGROUND ART

Nowadays cell size adjustment can be obtained by typically changing the beam tilt of the antenna through electromechanical actuators that control passive devices performing analogue Radio Frequency (RF) processing. This solution, however, presents many drawbacks, as its beam-shaping capability is poorly versatile.

In order to overcome the limitations of the previous approach, digital beamforming techniques can be applied.

According to classical electromagnetic theory, the shape of the beam radiated by planar or linear array antenna can be written as $$E(\underline{r}) = E_0(\underline{r})F(\hat{r})$$

where $\underline{E}_0(\underline{r})$ is the electromagnetic field radiated by each antenna element, $\underline{r}$ is the spatial vector, $\hat{r}$ is the unity-module vector with direction corresponding to spatial vector $\underline{r}$ and $F(\hat{r})$ is the array factor of the antenna. Once the basic radiating element is chosen ($\underline{E}_0(\underline{r})$), the shape of the radiation pattern can be fully controlled by operating on the array factor only.

For a Uniform Linear Array (ULA), composed by equally spaced elements, the array factor has the following expression:

$$F(\alpha) = \sum_{n=0}^{N-1} w_n \exp[jk_0 nd\cos(\alpha)]$$

where $k_0=2\pi/\lambda$ is the wave number, $\lambda$ is the wavelength, d is the inter-element spacing, $\alpha$ is the observation direction and $w_n = w_{rn} + jw_{in} = |w_n|\exp(j<w_n)$, which is the n-th feed coefficient or weight of the array, allows full control over the array factor shape (hence the beam shape of the field radiated by the antenna).

Techniques devoted to implementing beam forming can be classified into two main approaches: radio frequency (RF) processing and base band (BB) processing.

If radio frequency (RF), typically analogue, processing is considered, weights are applied through RF components which are able to modify both amplitude (RF amplifiers) and phase (RF phase shifters) of RF signal to/from each radiating element.

Document WO 03/015212 illustrates an active phased array antenna system in which a beam former is operable to process an analogue radio frequency signal or an analogue intermediate frequency signal. Programmable electronic power splitters and phase shifters, operating on analogue signals, are used for controlling both the amplitude and phase of each element of the antenna. Phase shifter in particular, which are implemented as Butler matrices, are quite complex systems, whose realization and integration into base stations or transceiver terminals can be complicated.

On the other hand, if baseband (BB), typically digital, signal processing is considered, beam forming is usually realized by multiplying digitised base-band complex signals at each array element by suitable complex coefficients (both in up-link and down-link). An example of a prior art digital beam forming baseband processing (down-link) is shown in FIG. 1.

In down-link, if a generic n-th array element is considered, the complex envelope signal related to it is $$s_{BBn}{}^w = w_n \tilde{s}(t)$$

where $\tilde{s}(t)=i(t)+jq(t)$ is the complex envelope of the input signal.

Figure 1:
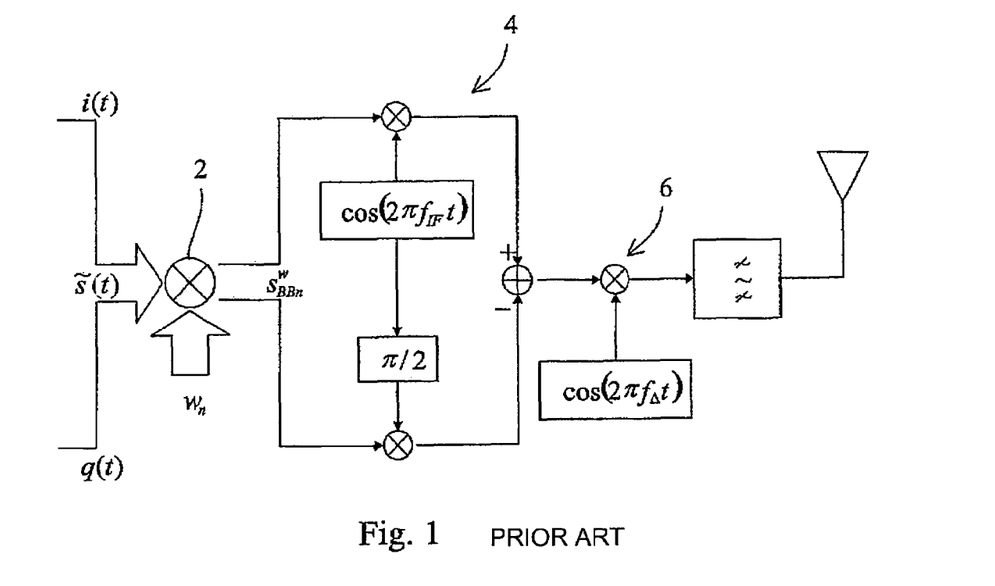
FIG. 1 is an exemplary schematic diagram of a prior art digital beam forming baseband processing system.

Hence, with reference to the scheme of FIG. 1, base-band digital processing just operates a multiplication 2 of a complex input signal $\tilde{s}(t)$ by a complex coefficient $w_n$. Once the signal input to the antenna has been weighted, it follows the standard steps through the down-link radio chain: up-conversion 6 to radio frequency (RF), through an intermediate frequency (IF) conversion 4, and high power amplification, not shown in FIG. 1.

The block diagram in FIG. 1 is also valid for the so-called zero-IF technique where the baseband signal is directly up-converted to RF ($f_0$), assuming that $f_{IF}=f_0$ and $f_A=0$.

Digital beam forming techniques applied to base-band signals are illustrated for example in documents U.S. Pat. No. 6,052,085 and US 2002/154687.

The techniques illustrated in the above-mentioned documents, operating on baseband signals, imply a good knowledge of how data corresponding to the base-band signals are organized and dealt with in the processing chain. In fact, usually, and particularly with regard to telecommunication apparatuses, this is a confidential and restricted information of the manufacturer. Moreover, if a remote control has to be implemented, apparatuses of the same manufacturer must be necessarily used.

The Applicant has tackled the problem of efficiently performing beam shaping on the radiation pattern of an array antenna, operating exclusively on digital signals.

The Applicant observes that digital beam-forming techniques are much more efficient and cost-effective than analogue ones.

In view of the above, it is an object of the invention to provide an efficient beam shaping technique which can be applied to digitised intermediate frequency signals.

SUMMARY OF THE INVENTION

The object of the present invention is thus to provide an arrangement that overcomes the drawbacks of the prior art arrangements as outlined in the foregoing.

According to the present invention, that object is achieved by means of a method and a system having the features set forth in the claims that follow.

The present invention also relates to a corresponding base transceiver station, incorporating the system of the invention, and a computer program product loadable in the memory of at least one computer and including software code portions for performing the method of the invention.

The Applicant has found that beam forming can be obtained by processing a digital intermediate frequency signal, by taking advantage of all capabilities of digital signal processing applied to antenna arrays, so that the resulting beam shape can be the same as the one obtained through more common either base-band or radio-frequency signal processing.

The Applicant has verified that weighting coefficients can be applied to an intermediate frequency signal, provided that the same signal has been previously duplicated in two identical components, the first component being subjected to a Hilbert transform operation and the second component being delayed in order to maintain it temporarily aligned with the first one.

While digital beam-forming is usually performed on base-band signals, which manufacturers typically do not allow to access for confidentiality reasons, the invention manages intermediate frequency signals only, according to an OEM-independent and non-intrusive approach. The choice of intermediate frequency signals can be considered a manufacturer-independent one, enabling the present approach to be applied to every kind of beam forming systems where the intermediate frequency stage is implemented.

DETAILED DESCRIPTION OF THE PREFERRED EMBODIMENTS

Figure 2:
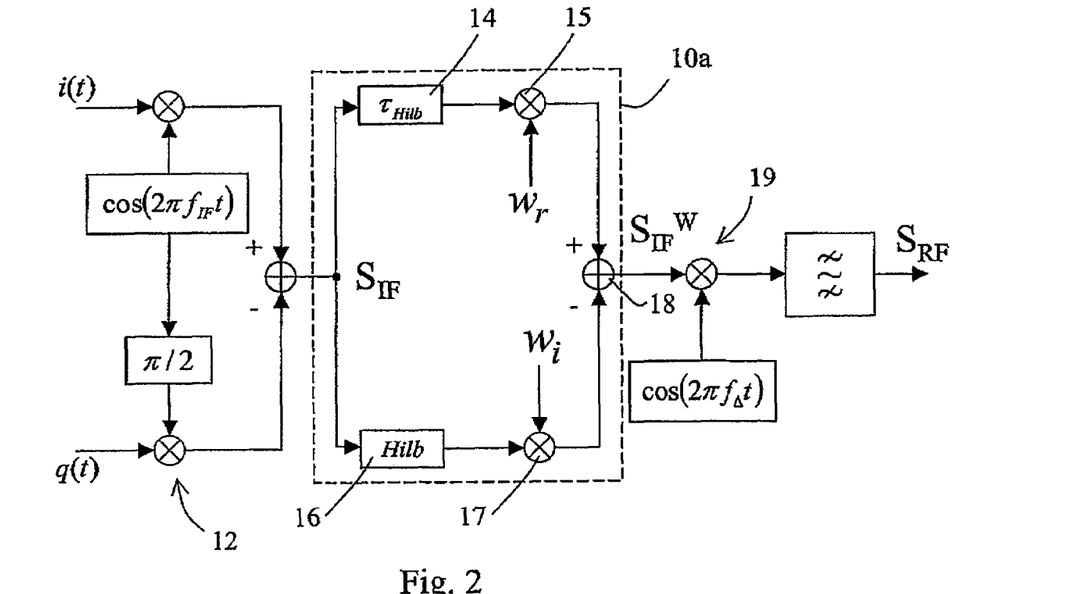
FIG. 2 is a first exemplary schematic diagram of a digital beam forming processing system realised according to the present invention.

A first exemplary schematic diagram of a digital beam forming processing system realised according to the present invention is shown in FIG. 2. An intermediate frequency IF signal $S_{IF}$, obtained for example by up-conversion 12 from a base band input signal $\tilde{s}(t)=i(t)+jq(t)$, is processed by a beam forming block 10a, for obtaining an output weighted IF signal $S_{IF}^W$. The output signal $S_{IF}^W$ is then up-converted 19 to a radio frequency signal $S_{RF}$, according to well known techniques.

The operation of beam forming block 10a will now be explained in detail. The $S_{IF}^W$ signal, centred at frequency $f_{IF}$, feeding the n-th antenna element of an array antenna, can be expressed as $$s_{IFn}^w(t)=Re\{w_n\tilde{s}(t)\exp(j2\pi f_{IF}t)\}$$

where $W_n$ is the n-th complex weight and $\tilde{s}(t)=i(t)+jq(t)$ is the complex envelope of the IF signal. The previous equation can be rewritten as:

$$\begin{aligned}s_{IFn}^w(t) &= w_{rn}Re\{\tilde{s}(t)\exp(j2\pi f_{IF}t)\} + w_{in}Re\{\tilde{s}(t)\exp(j2\pi f_{IF}t + \pi/2)\} \\ &= w_{rn}Re\{\tilde{s}(t)\exp(j2\pi f_{IF}t)\} - w_{in}Im\{\tilde{s}(t)\exp(j2\pi f_{IF}t)\}\end{aligned}$$

where the non-weighted IF signal and its Hilbert transform are multiplied by the real and the imaginary part of $W_n$ respectively. Hence, the weighted IF signal can be expressed as:

$$s_{IFn}^w(t)=w_{rn}s_{IF}(t)-w_{in}H\{s_{IF}(t)\}$$

where $$s_{IF}(t)=Re\{\tilde{s}(t)\exp(j2\pi f_{IF}t)\}$$

is the non-weighted real IF signal and $H\{\bullet\}$ is the Hilbert transform operator.

With reference to FIG. 2, the $S_{IF}$ signal is duplicated and processed in parallel by two signal processing sub-chains. A Hilbert transform block 16 operates a Hilbert transform on the $S_{IF}$ signal, afterwards the transformed signal is multiplied, in block 17, by an imaginary part $W_i$ of the complex weight coefficient. In a second signal processing sub-chain the $S_{IF}$ signal is delayed by a predetermined time, block 14, in order to maintain such signal temporarily aligned with the corresponding transformed signal, and then multiplied, in block 15, by a real part $W_r$ of the complex weight coefficient.

The two signals are then combined, by means of a subtracter 18, into a weighted digital IF signal $S_{IF}^W$, by subtracting the signal which has been multiplied by the imaginary part $W_i$ of the complex weight coefficient from the signal which has been multiplied by the real part $W_r$ of the same weight coefficient.

Figure 3:
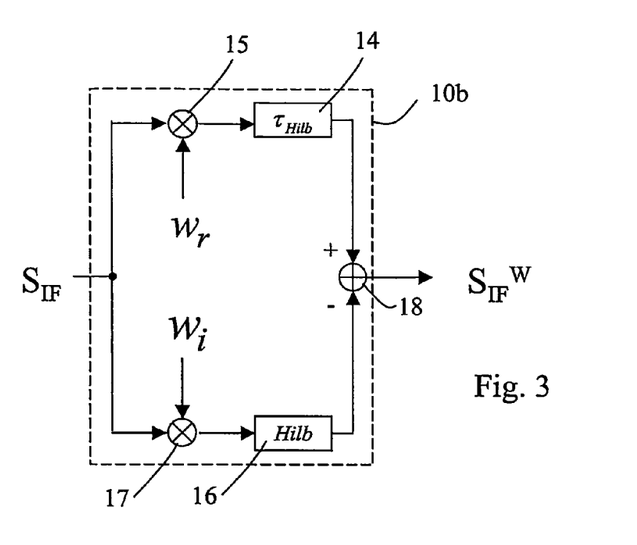
FIG. 3 is a second exemplary schematic diagram of a digital beam forming processing system realised according to the present invention.

Thanks to the linearity property of the Hilbert transform, an alternative embodiment 10b of the beam forming block 10a previously illustrated can be derived as shown in FIG. 3, where: the duplicated $S_{IF}$ signals are first multiplied by the real $W_r$ and imaginary part $W_i$ of the complex weight coefficient, in blocks 15 and 17 respectively; then the signal output by block 15 is delayed 14, while the signal output by block 17 is Hilbert-transformed 16; a subtracter 18 combines the two signals, as previously described with reference to FIG. 2, into a weighted digital IF signal $S_{IF}^W$.

Either block 10a or block 10b can be used for transforming the input signal $S_{IF}$ into its weighted version $S_{IF}^W$. For optimization purposes, block 10a can be used in a down-link signal processing stage of a base station, while block 10b can be used in an up-link signal processing stage of a base station. In that way, in fact, the architecture of a base station transceiver can be significantly simplified by using one Hilbert transformer per stage only.

The weight coefficients used in blocks 10a and 10b, operating at IF, can be the same weight coefficients which are used for base-band or radio frequency processing, in prior art arrangements.

Figure 4:
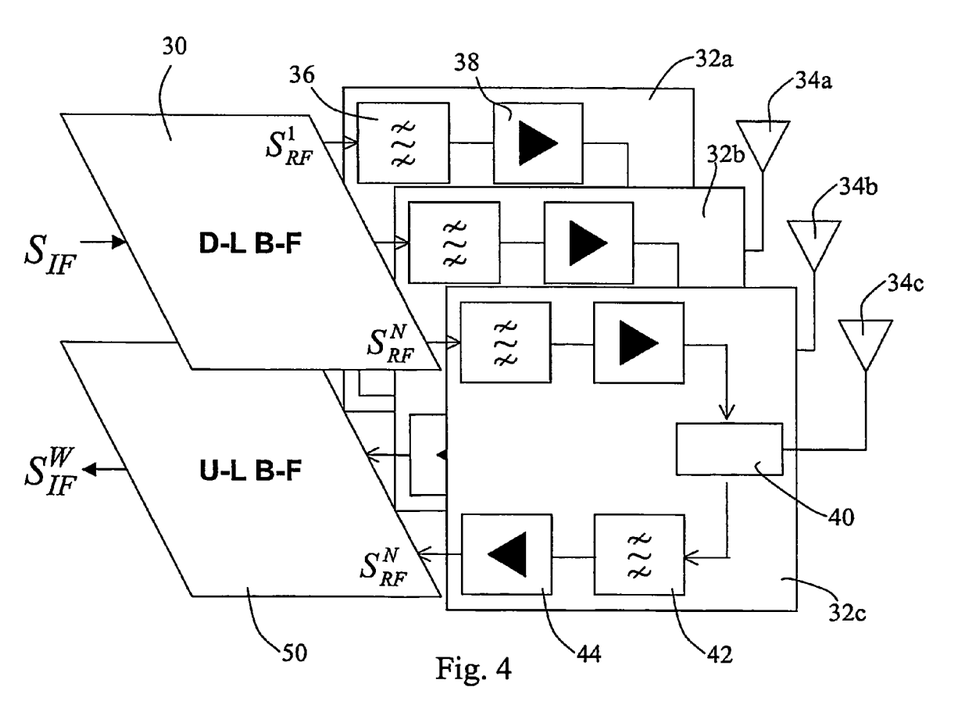
FIG. 4 is a functional block diagram of a portion of a signal processing chain in a base transceiver station realised according to the present invention.

FIG. 4 shows a functional block diagram of a portion of a signal processing chain in a base transceiver station. A downlink beam forming module 30, operating according to the method previously illustrated, transforms an IF signal $S_{IF}$, into a plurality of weighted IF signals $S_{IF}^{W1} \ldots S_{IF}^{WN}$ and operates on the weighted signals an up conversion to corresponding RF signals $S_{RF}^{1} \ldots S_{RF}^{N}$, as explained in detail hereinbelow with reference to FIG. 5.

Radio frequency signals $S_{RF}^{1} \ldots S_{RF}^{N}$ are then processed by blocks 32a . . . 32c, in which they are filtered 36 in order to erase spurious components, and then amplified 38, just before reaching a duplexer 40 and a corresponding antenna element 34a . . . 34c. The duplexer allows to use the same antenna for both up and down-link.

In up-link the signal received, through duplexer 40, from each antenna element 34a . . . 34c is filtered 42 in order to reduce noise effects and then amplified 44, before reaching an up-link beam forming module 50, explained in detail hereinbelow with reference to FIG. 6.

Figure 5:
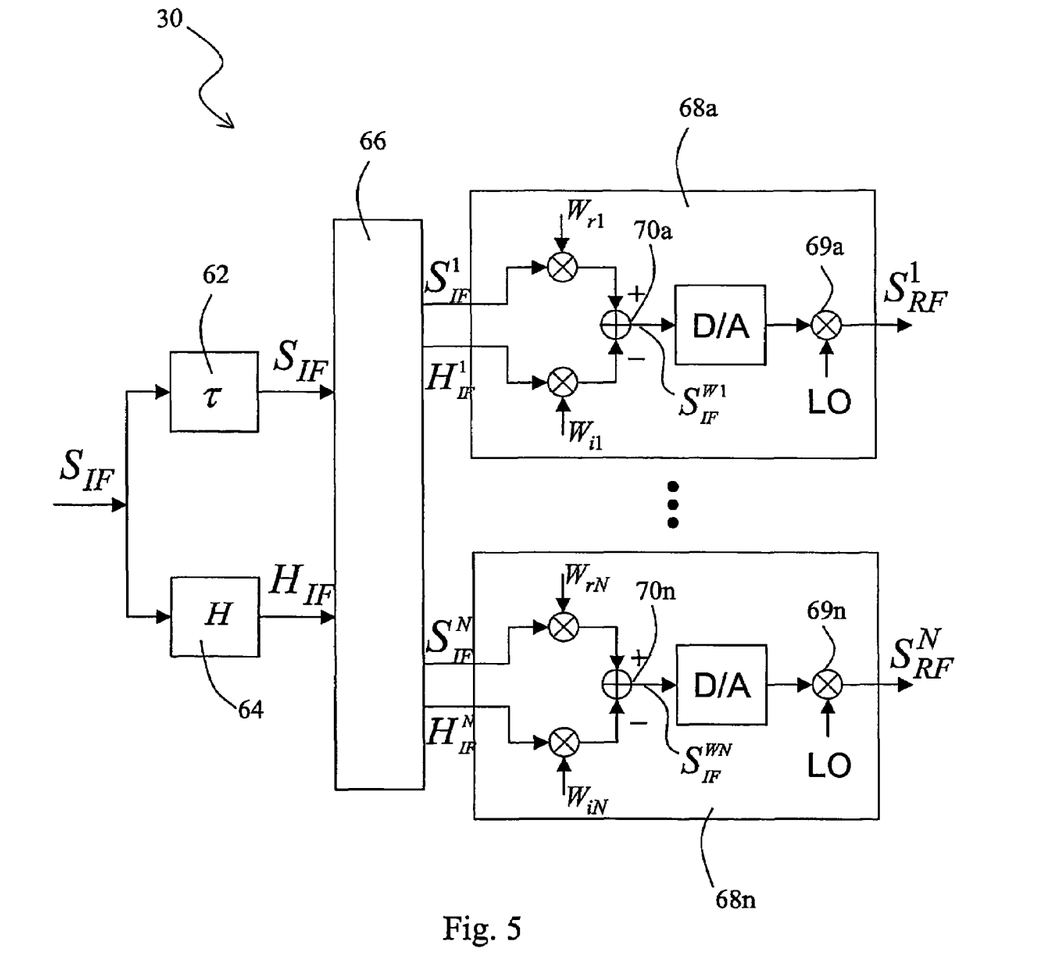
FIG. 5 is a block diagram of a digital beam forming processing system in a downlink stage of a base transceiver station realised according to the present invention.

With reference to FIG. 5, the IF signal $S_{IF}$ is splitted into two identical signals, a first one is delayed in block 62 to be temporarily aligned to the second one, which is processed by a Hilbert transformer 64, for example a digital filter specifically designed. The two signals, respectively $S_{IF}$ and $H_{IF}$, are then replicated N times by means of a splitter 66. Then each replica of the couple $S_{IF}$, $H_{IF}$ is multiplied by the real and the imaginary part of the corresponding weight. They are then subtracted in block 70a . . . 70n, obtaining weighted signals $S_{IF}^{W1} \ldots S_{IF}^{WN}$, and converted to analogue signals by means of a D/A converter. A final up-conversion through blocks 69a . . . 69n, is required to get the output RF signals $S_{RF}^{1} \ldots S_{RF}^{N}$.

Figure 6:
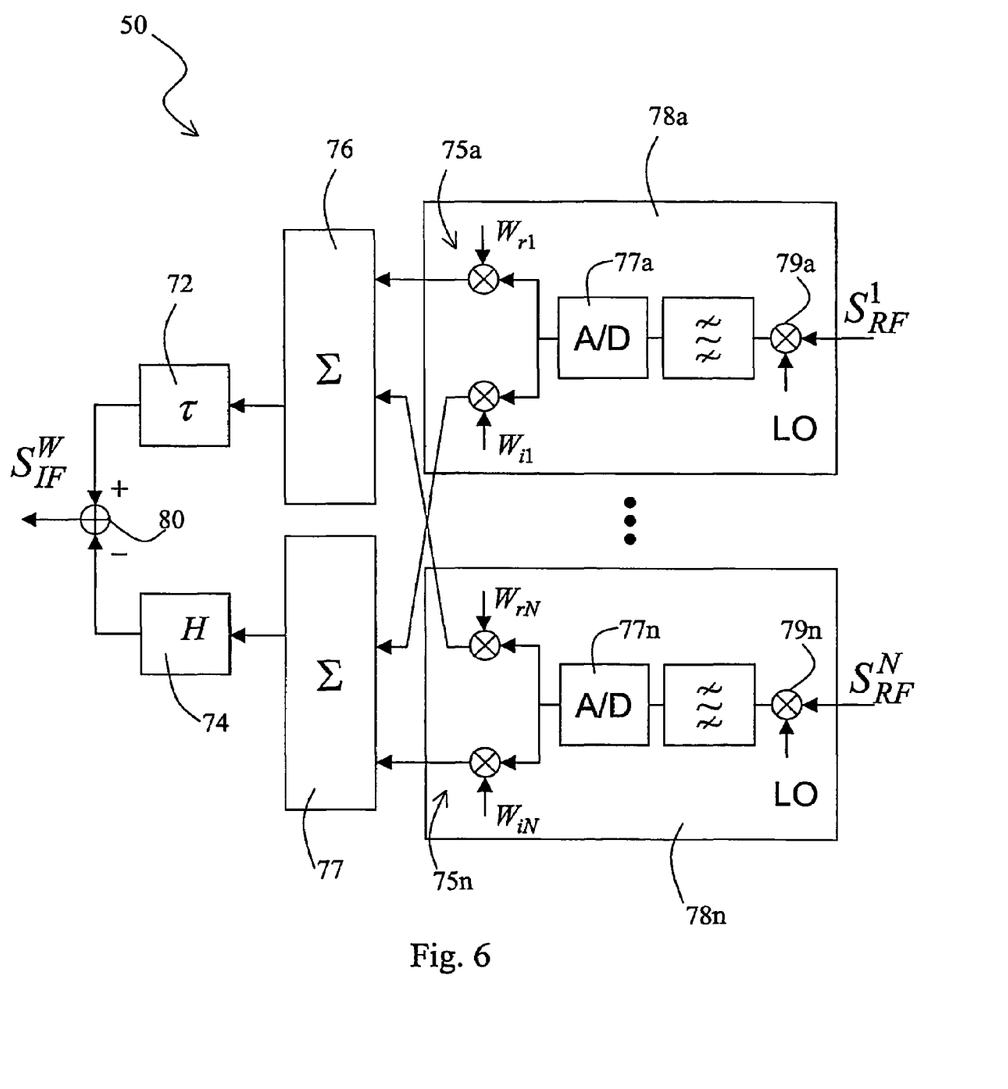
FIG. 6 is a block diagram of a digital beam forming processing system in an uplink stage of a base transceiver station realised according to the present invention.

With reference to FIG. 6, the RF signals $S_{RF}^{1} \ldots S_{RF}^{N}$, received from blocks 32a . . . 32c in FIG. 4, are down converted to IF, in blocks 79a . . . 79n, and the resulting signals are digitised, by means of A/D converters 77a . . . 77n, and splitted into two replicas. Each replica of signal couple is subject to a weighting operation 75a . . . 75n, and the contribution from all N branches 78a . . . 78n are summed by means of a first 76 and a second 77 adder before reaching a common Hilbert transform block 74 and a common delay block 72. The two signals are then subtracted, block 80, obtaining a weighted IF signal $S_{IF}^{W}$.

Figure 7:
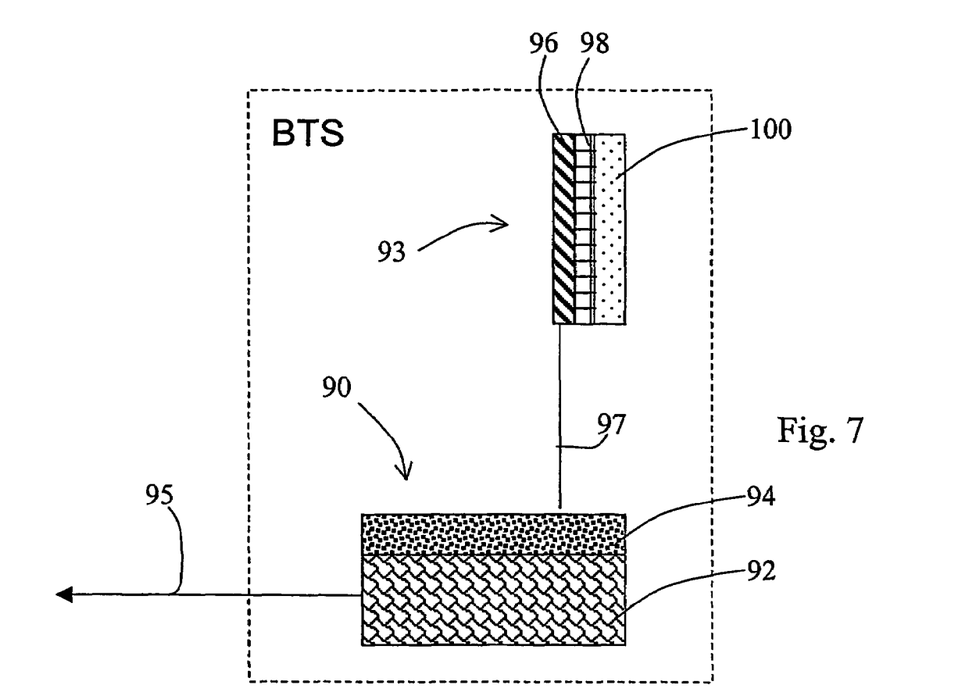
FIG. 7 is a first exemplary block diagram of a base transceiver station incorporating a digital beam forming processing system realised according to the present invention.
Figure 8:
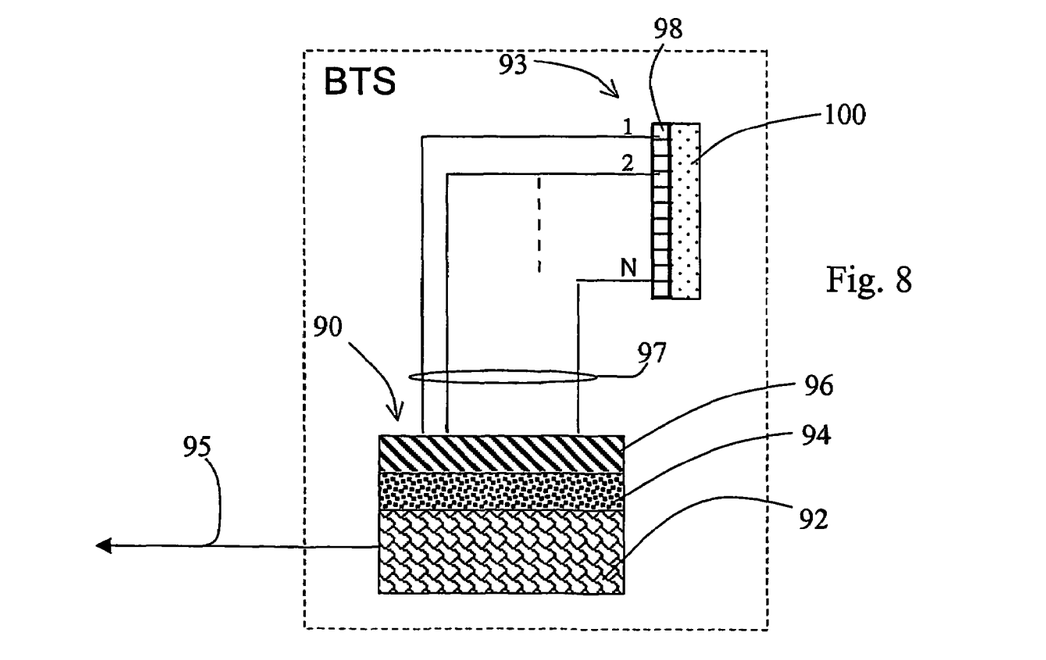
FIG. 8 is a second exemplary block diagram of a base transceiver station incorporating a digital beam forming processing system realised according to the present invention.
Figure 9:
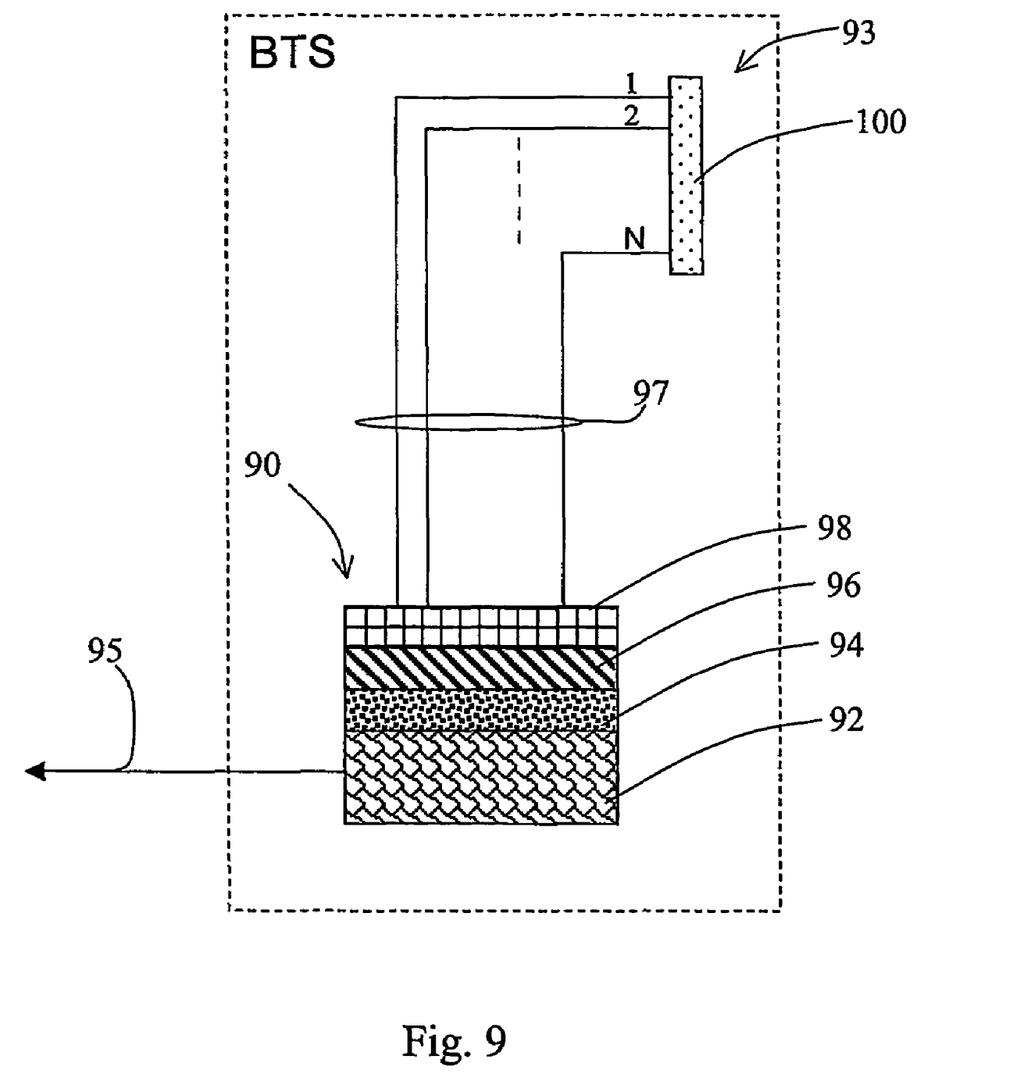
FIG. 9 is a third exemplary block diagram of a base transceiver station incorporating a digital beam forming processing system realised according to the present invention.

FIGS. 7, 8 and 9 show three exemplary block diagrams of base transceiver stations (BTS) incorporating a system for performing digital beam forming on the radiation pattern of an array antenna realised according to the invention. A base transceiver stations BTS schematically comprises a central unit 90, coupled to a core network by means of a link 95, and an antenna unit 93, connected to the central unit 90 by means of a link 97, e.g. a cable (either electric, such as coaxial cable, or optical, such as optical fibre cable) or a plurality of cables. The base station comprises a base band processing module 92, a first conversion module 94 (BB<->IF) for converting BB signals to IF signals and vice-versa, a beam forming module 96 operating on IF signals according to the present invention, a second conversion module 98 (IF<->RF) for converting IF signals to RF signals and vice-versa, and a plurality of antenna elements 100.

In the exemplary block diagram of FIG. 7 the beam forming module 96 is incorporated into the antenna unit 93, which receives an IF signal from the central unit 90 through the link 97.

In the exemplary block diagram of FIG. 8 the central unit 90 comprises the beam forming module 96, which is connected to the second conversion module 98 (IF<->RF) by means of a plurality of links 1 . . . N, one for each antenna element 100.

In the third exemplary block diagram, shown in FIG. 9, both the beam forming module 96 and the second conversion module 98 (IF<->RF) are incorporated into the central unit 90, which is connected to the antenna unit 100 by means of a plurality of links 1 . . . N, one for each antenna element 100.

The invention claimed is:

1. A method of performing digital beam forming on the radiation pattern of an array antenna comprising a plurality of antenna elements, each antenna element being coupled to a signal processing chain, comprising a weighting phase in which at least a complex weight coefficient is applied to a digital signal in a corresponding signal processing chain, said digital signal being an intermediate frequency digital signal, and said weighting phase comprising the following steps:
    a) duplicating said digital signal into a first and a second digital signal;
    b) processing said first and second digital signals by:
        multiplying said first and second digital signals respectively by a real and an imaginary part of said complex weight coefficient;
        applying a Hilbert transform to that signal which is multiplied by the imaginary part of said complex weight coefficient; and
    c) combining said processed first and second digital signals into a weighted digital intermediate frequency signal by subtracting said second signal from said first signal.

2. The method according to claim 1, wherein said step of applying the Hilbert transform is performed before said step of multiplying said first and second digital signals by the real and imaginary parts of said complex weight coefficient.

3. The method according to claim 1, wherein said processing step comprises:
    delaying said first signal, which is multiplied by the real part of said complex weight coefficient, by a predetermined time, in order to maintain such signal temporarily aligned with said second signal.

4. The method according to claim 3, wherein said step of applying a Hilbert transform to said second signal and said step of delaying said first signal are performed commonly to a plurality of intermediate frequency digital signals parallelly processed in corresponding signal processing chains.

5. The method according to claim 4, wherein said step of multiplying said first and second digital signals respectively by a real and an imaginary part of said complex weight coefficient is performed independently on the signal processing chain of each antenna element using a corresponding weight coefficient.

6. A system for performing digital beam forming on the radiation pattern of an array antenna, said array antenna comprising a plurality of antenna elements, each antenna element being adapted for coupling to a signal processing chain suitable for applying to a digital signal at least a corresponding complex weight coefficient, said digital signal being an intermediate frequency digital signal comprising:

a first signal processing sub-chain operating on said intermediate frequency digital signal comprising a first multiplier for multiplying said intermediate frequency digital signal by a real part of said complex weight coefficient;

a second signal processing sub-chain operating in parallel with said first signal processing subchain on said intermediate frequency digital signal, comprising:

a Hilbert transform block for applying a Hilbert transform to said intermediate frequency digital signal;

a second multiplier for multiplying said intermediate frequency digital signal by an imaginary part of said complex weight coefficient, said Hilbert transform block and said second multiplier operating in cascade on said intermediate frequency digital signal; and a subtracter for subtracting the signal processed by said second signal processing sub-chain from the signal processed by said first signal processing sub-chain, thus obtaining a weighted digital intermediate frequency signal.

7. The system according to claim 6, wherein said Hilbert transform block processes said intermediate frequency digital signal before the same signal reaches said second multiplier.

8. The system according to claim 6, wherein said second multiplier processes said intermediate frequency digital signal before the same signal reaches said Hilbert transform block.

9. The system according to claim 6, wherein said first signal processing sub-chain further comprises a delay block operating in cascade with said first multiplier on said intermediate frequency digital signal.

10. The system according to claim 9, wherein said delay block processes said intermediate frequency digital signal before the same signal reaches said first multiplier.

11. The system according to claim 9, wherein said first multiplier processes said intermediate frequency digital signal before the same signal reaches said delay block.

12. The system according to claim 9, comprising a down-link beam forming module comprising:

a Hilbert transform block shared among a plurality of second signal processing sub-chains;

a delay block shared among a plurality of first signal processing sub-chains;

a splitter for replicating output signals from said Hilbert transform block and said delay block and for feeding corresponding first and second multipliers in said plurality of first and second signal processing subchains; and     a plurality of subtracters for subtracting the signal processed by each second signal processing sub-chain from the signal processed by a corresponding first signal processing sub-chain, thus obtaining a weighted digital intermediate frequency signal.

13. The system according to claim 9, comprising an up-link beam forming module comprising:

a Hilbert transform block shared among a plurality of second signal processing sub-chains;

a delay block shared among a plurality of first signal processing sub-chains;

a first adder for summing contributions from a plurality of first multipliers in said plurality of first signal processing sub-chains and for feeding said delay block;

a second adder for summing contributions from a plurality of second multipliers in said plurality of second signal processing sub-chains and for feeding said Hilbert transform block; and     a subtracter for subtracting the signal processed by said Hilbert transform block from the signal processed by said delay block, thus obtaining a weighted digital intermediate frequency signal.

14. A base transceiver station in a mobile communication network comprising a system for performing digital beam forming on the radiation pattern of an array antenna according to claim 6.

15. The base transceiver station according to claim 14, comprising a central unit and an antenna unit, said antenna unit being connected to said central unit by means of a link, wherein said system for performing digital beam forming is located within said antenna unit.

16. The base transceiver station according to claim 15, wherein said link is an optical fibre cable.

17. The base transceiver station according to claim 14, comprising a central unit and an antenna unit, said antenna unit being connected to said central unit by means of a link, wherein said system for performing digital beam forming is located within said central unit.

18. A computer program product loadable in the memory of at least one computer and comprising software code portions capable of performing the steps of the method of claim 1.

* * * * *

UNITED STATES PATENT AND TRADEMARK OFFICE
CERTIFICATE OF CORRECTION

PATENT NO. : 7,403,156 B2  Page 1 of 1
APPLICATION NO. : 10/575855
DATED : July 22, 2008
INVENTOR(S) : Coppi et al.

It is certified that error appears in the above-identified patent and that said Letters Patent is hereby corrected as shown below:

Title page, item (73), line 1, "Telecon" should read --Telecom--.

Claim 6, column 7, line 7, "subchain" should read --sub-chain--.

Claim 12, column 8, line 2, "subchains;" should read --sub-chains;--.

Signed and Sealed this

Eighteenth Day of November, 2008

JON W. DUDAS
*Director of the United States Patent and Trademark Office*